United States Patent [19]
Gilwood

[11] Patent Number: 5,445,073
[45] Date of Patent: Aug. 29, 1995

[54] APPARATUS AND PROCESS FOR COOKING POTATOES

[76] Inventor: William C. Gilwood, 2233 S. Highland Ave., Apt. 507, Lombard, Ill. 60148

[21] Appl. No.: 104,810

[22] Filed: Aug. 10, 1993

Related U.S. Application Data

[63] Continuation-in-part of Ser. No. 868,326, Apr. 14, 1992, abandoned.

[51] Int. Cl.⁶ .................. A47J 37/00; A47J 37/04
[52] U.S. Cl. .......................................... 99/427; 34/225; 99/323.5; 99/330; 99/403; 99/415; 99/418; 99/450; 126/21 A; 219/400; 426/520; 426/523
[58] Field of Search .............. 99/323.5, 323.6, 323.7, 99/323.8, 323.9, 323.11, 403, 407, 413, 415, 417, 418, 426, 427, 440, 441, 447, 450, 476, 473, 474; 126/21 A, 15 R, 55, 71, 146, 369, 258, 260, 275 E, 275 R; 219/400, 389, 214; 32/236; 34/132, 133 R, 133 H, 218, 219, 225, 224

[56] References Cited

U.S. PATENT DOCUMENTS

| | | | |
|---|---|---|---|
| 134,143 | 12/1872 | Jacobus | 99/427 |
| 1,713,539 | 5/1929 | Le Claire | 99/471 |
| 3,026,790 | 3/1962 | Arvan | 99/407 |
| 3,962,962 | 6/1976 | Anderson | 99/474 |
| 4,137,834 | 2/1979 | Uibel | 99/348 |
| 4,155,294 | 5/1979 | Langhammer et al. | 219/400 X |
| 4,410,553 | 10/1983 | McGinty | 99/450 |
| 4,581,989 | 4/1986 | Swartley | 126/21 A |
| 4,722,322 | 2/1988 | Varney et al. | 126/25 R |
| 4,865,864 | 9/1989 | Rijswijck | 426/520 |
| 5,097,754 | 3/1992 | Covington et al. | 99/476 |

FOREIGN PATENT DOCUMENTS 772887 11/1934 France .................. 99/476

Primary Examiner—Timothy F. Simone

[57] ABSTRACT

An apparatus and process of cooking potato pieces fluidized in upwardly flowing heated air in an inverted conical cooking chamber to produce hot browned potatoes with a moisture content over 40%. According to the invention the apparatus is provided with a multi-speed air blower to provide higher pressure heated air to the bottom of cooking chamber at startup of cooking to overcome jamming of potato pieces; supplemented by mechanically moving a perforated bottom support platform upwardly in the cooking chamber at startup of cooking to push any jammed potato pieces into the upwardly flowing air to assure fluidization.

20 Claims, 2 Drawing Sheets

APPARATUS AND PROCESS FOR COOKING POTATOES

This is a continuation-in-part of application Ser. No. 07/868,326 filed Apr. 14, 1992 abandoned.

BACKGROUND—FIELD OF INVENTION

This invention relates to a process and apparatus to cook potato pieces in small batches in a fluidized bed using upwardly flowing heated air in restaurant or home kitchen sized equipment to make a product equivalent to "French fried" potatoes.

BACKGROUND—DESCRIPTION OF PRIOR ART

Fluid bed apparatus and drying and processing of solid materials in fluidized beds are well known in the art. They have been employed in large scale continuous factory production operations for processing of food products.

For example, Griffiths et al U.S. Pat. No. 2,705,679 discloses a process and apparatus to dry and cook potato pieces wherein the potato pieces are fed into an upflowing heated air stream to fluidize them.

Dale et al U.S. Pat. No. 3,849,900 discloses an apparatus and method of drying fragile cheese products in a fluidized bed wherein fluidizing air is applied as rotating high velocity air streams to prevent channeling and agglomeration.

Tesch et al U.S. Pat. No. 4,309,829 discloses the need to avoid batch fluidized operations because of agglomeration even with the improvement in Dale et al U.S. Pat. No. 3,849,900; and discloses the feeding of the cheese particulates into a continuous upflowing heated air stream to fluidize them and avoid agglomeration.

Svensson et al U.S. Pat. No. 4,478,141 discloses an apparatus for freezing particulate food products in a fluidized bed and utilizing pulsating air flow to avoid frozen agglomerates from forming.

Although these prior art procedures are useful in large scale factory production operations, they do not overcome all the problems which are encountered in cooking potato pieces of the size used for "French fried" potatoes when cooked in batch type cooking equipment suitable for use in restaurants or in the home.

SUMMARY OF THE INVENTION

This invention relates to a process and apparatus to cook potatoes and other foods using heated air.

It is an object of this invention to cook potato strips or pieces in hot air so that they look like and taste like hot "French fried" potatoes ready for serving. The hot cooked potatoes of this invention are free of the fat, oil, lipids and cholesterol present in conventional deep oil cooked "French fried" potatoes. The hot air cooked potatoes of this invention are also substantially lower in their nutritional calorie content than common oil cooked "French fried" potatoes and are nutritionally more beneficial to health.

It is another object of this invention to provide an easily controlled hot air cooking apparatus to quickly and conveniently cook batches of potato strips or diced potatoes to make hot fat free potatoes that look like and taste like "French fried" potatoes for immediate hot serving in restaurants and at home. The operation of this apparatus is simple so that such hot air cooked potatoes can be made by unskilled persons.

It is another object of the hot air cooking apparatus of this invention to eliminate the fire, safety, sanitation and environmental problems associated with the common use of deep hot oil or deep hot fat cooking devices conventionally used for preparing "French fried" potatoes.

These and other objects of the invention will become apparent upon consideration of the description and claims which follow.

In the process of this invention potato pieces (strips or dice) are immersed in a hot upwardly flowing vertical air stream in a batch in a cooking chamber in which air velocities are sufficient to suspend or fluidize all the potato pieces and keep them separated from each other during cooking. To obtain more uniform fluidization, the cooking chamber should be in the shape of an inverted frustum of a cone or pyramid. A rectilinear chamber with an inverted trapezoidal cross section can also be employed.

For ease of handling, the cooking chamber is a movable basket in the shape of an inverted frustum of a cone with non-foraminous rigid sheet sidewall, provided with a foraminous, perforated metal or wire mesh screen at top and bottom. Foraminous, screen or perforate openings at top and bottom of the basket should be sufficiently small to retain the smallest pieces but large enough to permit upward air flow with minimum air restrictions. Heated air is blown into the bottom of the cooking chamber basket and because of its expanding cross-section, upward air velocities successively decrease toward the upper end of the basket.

The batch of uncooked potato pieces is placed into the basket to partially fill the basket providing sufficient open space above the bed of potato pieces to permit fluidized suspended expansion of the bed when air flow is initiated.

Inlet air temperatures into the bottom of the cooking chamber should be 400° F. and 500° F. To obtain the proper taste and yellow-brown color of the potato pieces, cooking should be maintained for one to five minutes depending on the initital moisture content of the potatoes. Good tasting, yellow-brown color, air cooked potatoes can be made from raw cut, blanched, dehydrated, or dehydro-frozen potatoes having at least 55%–60% moisture content. Cooking time should be limited to avoid reducing the moisture content below 40% to prevent excessive hardening of the air cooked potato pieces. Cooking time can best be controlled on the basis of visual observation of the yellow-brown coloration of the potatoes. When this color has developed suitably, or after a pre-set time, the hot air flow is discontinued; the basket is removed from the housing, the cooked potatoes are removed from the basket by removing the top retaining screen, and are served hot. This process can be used for cooking other foods such as sweet potatoes and carrots.

The movable cooking chamber basket is mounted to mate on a cooking chamber support base, provided with an air passage for air flow, within the cooking chamber housing. Heated air is blown into the support base air passage below the basket mounted on the support base. To restrict or minimize the bypassing of air flow outside the basket it is preferable to provide an easily releasable closure or gasket seal between the exterior of the basket and the support base air passage, so as to direct the air flow upwardly into the bottom interior of the basket.

Preferably the uncooked potato pieces should be between $\frac{1}{2}''$ to $1\frac{1}{2}''$ long and $\frac{1}{4}''$ and $\frac{1}{2}''$ in thickness and width. The potato pieces are fluidized by flowing heated air at velocities of 500 to 600 feet per minute at the bottom screened basket inlet, and up through the bed of potato pieces inside the basket. Upward air velocities decrease to less than 100 feet per minute in the upper end of the cooking chamber basket.

The cooking chambers for apparatus of this invention for restaurants or homes are small in size so that their bottom dimensions are only a few dimensions greater than the potato pieces being cooked. Jamming or interlocking of the potato pieces in the bottom of the chamber basket may occur. It is necessary to consistently insure fluidization of the potato pieces in the basket during cooking, because if the bed of potato pieces remains interlocked for too long in heated air, the potato pieces begin to char at the sharp edges and corners of the pieces and their taste is spoiled. When cooking those varieties of potato pieces that cling together, it has been found necessary to mechanically disturb the bed of potato pieces in the basket by mechanically lifting them into the upwardly flowing air at startup of fluidization rather than depending only on aerodynamic movement. The use of rotary mechanical agitators in contact with potato pieces is undesirable because they physically damage the potato pieces.

This invention discloses an improved process and apparatus to insure adequate fluidization of the potato pieces to consistently overcome their interlocking and charring, wherein the bed of potato pieces in the inverted conical basket is disturbed mechanically while passing heated air upwardly through the bed. This disturbance of the bed is accomplished by mechanically thrusting the bed of potato pieces upwardly in the basket, repeatedly if necessary, while passing heated air up through the bed. Such mechanical disturbance of the bed can be accomplished by moving a vertically movable rigid horizontal air permeable foraminous, perforated or wire mesh screen support platform mounted in the bottom of the basket up and down while passing heated air upwardly through the bed of potato pieces in the basket. When cooking potato pieces that have a low initial surface water content, that do not cling together strongly, a single upward thrust of the platform at startup of cooking has been sufficient to insure fluidization. It has also been found helpful for fluidization to increase initial bottom inlet air flows into the bottom of the basket to 1000 to 1200 feet per minute for a fraction of a minute at startup of cooking. For cooking larger potato pieces it is desirable to employ basket inlet air velocities up to 1000 feet per minute.

It has been found that an accretion of dried residues, eroded from the fluidized potato pieces, form on the inner sidewall surfaces of the cooking basket on repeated operations of the apparatus. It has been found that such accretions on the inner surfaces of the cooking basket can be prevented by applying a thin film of edible oil on the inner surfaces of the cooking basket prior to filling the basket with a charge of potatoes. Such accretions can also be prevented by applying a silicone polymer on these surfaces, or coating the interior surfaces with teflon.

It should be understood that the invention is not limited to the specific structural details of the embodiments shown.

DESCRIPTION OF PREFERRED EMBODIMENTS

Figure 1:
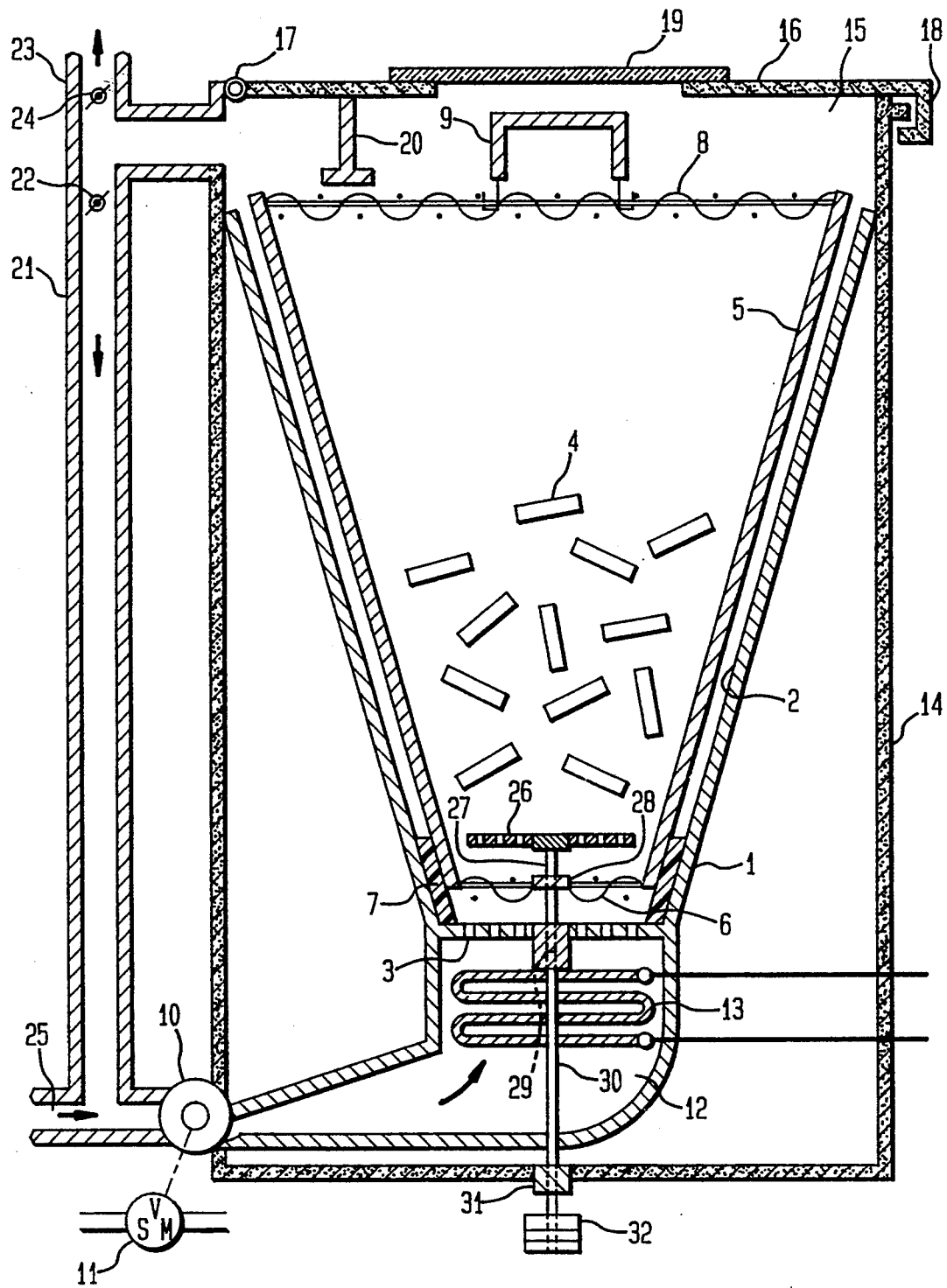
FIG. 1 shows a verticaly cross-section view of the up flow hot air cooking apparatus containing a cooking basket provided with a vertically movable perforated support platform to assist fluidization of the potato pieces.

One embodiment of this invention to prepare air cooked potato pieces on-site at a restaurant is illustrated in vertical cross-section view in FIG. 1.

In FIG. 1 the cooking apparatus comprises a cooking chamber support base 1 in the shape of an inverted frustum of a cone, said cooking chamber base having an unperforated metal sidewall 2, a horizontal perforated distributor plate 3 at its bottom, and being open at its top. The perforated plate 3 is provided to uniformly distribute upwardly flowing heated air into the inverted conically shaped cooking chamber basket. Satisfactory cooking of the potato pieces can be attained without the distributor plate, but more uniform fluidization of the potato pieces is maintained with the distributor plate. For easy removal of the air cooked potato pieces of this invention, the potato pieces 4 are placed in basket 5 which can be mounted in and subsequently removed from the cooking chamber support base 1. The basket 5 is only partially filled with potato pieces so as to provide expansion space for fluidizing the pieces during cooking. The removable basket 5 is in the shape of an inverted frustum of a cone similar in angularity to cooking chamber support base 1, and its bottom diameter slightly less than the bottom inside diameter of the cooking chamber base 1, so as to make a close fit when mounted on it. Basket 5 has an unperforated metal sidewall and is provided with a bottom screen 6. The inner wall 2 of cooking chamber base 1 is provided with a heat resistant plastic seal gasket 7 on its inner bottom periphery facing the outer wall of basket 5 to insure that upwardly flowing air entering the chamber base 1 passes through basket bottom wire mesh screen 6 and does not bypass it. Basket 5 is provided with a fastenable but removable wire mesh screened cover 8 to contain the potato pieces; and a handle 9 to ease lifting the basket from cooking chamber base 1 after completion of cooking. A blower 10 driven by electric motor 11 provides air flow through plenum 12 containing an electric heating coil 13, said heated air is led through a duct to the underside of perforated distributor plate 3. For convenience and energy efficiency, basket 5, cooking chamber base 1, heating coil 13 and air blower 10 are mounted one above the other in an insulated housing chamber 14. Insulated housing 14 has a freeboard plenum 15 above both cooking chamber base 1 and basket 5. Housing 14 is provided with a fastenable hinged cover 16 which has a transparent glass window 19 to permit visual observation of the extent of cooking. Cover 16 is provided with a hinge 17, a closure 18 and an internal extension arm 20 to keep basket 5 in place in chamber support base 1 when cover 16 is closed.

The upwardly flowing heated air, after passing through the fluidized bed of potato pieces in basket 5, enters plenum 15 and part of it is recirculated back through air return duct 21 and damper 22. Exhaust air is vented through duct 23 and damper 24. Fresh air enters through air intake duct 25.

In the operation of the apparatus, basket 5 partially filled with a charge of potato pieces 4 with base 1. Housing cover 16 is closed and motor 11, its cover 8 fastened, is mounted in cooking chamber blower 10 and heating coil 13 are started. It has been found that often on startup, jamming or interlocking of the potato pieces prevents fluidization and proper cooking. One object of this invention is to avoid such interlocking or jamming. To attain this object it is advantageous that electric motor 11 is a two-speed or multi-speed motor. A high motor speed should be employed at startup and subsequently reduced to normal speed. Blower 10 should be capable of delivering an air flow of 1000 to 1200 feet per minute at the bottom of cooking chamber support base 1 when the motor is in its high speed mode at the start of cooking. The higher shut-off pressure at the high speed mode of the blower usually overcomes jamming of potato pieces in the basket. Blower motor speed should be reduced to normal air flow immediately after fluidization. It is important to lower the air flow promptly after initial startup to avoid clogging of the basket screened cover 8 by potato pieces, because such clogging may suddenly restrict the air flow sufficiently to cause settling and jamming or interlocking of potato pieces in the bottom of the cooking chamber. It is therefore preferable that the motor speed be reduced to the normal low speed mode 2 to 10 seconds after startup.

It has been found that if the potato pieces are fresh cut and wet, they cling together more and are more likely to interlock or jam, interfering with fluidization at startup of cooking. Another object of this invention is to provide a supplemental means to prevent such jamming of the potato pieces at startup. This is accomplished by mechanically pushing any interlocked layer of potato pieces vertically upward for a short time interval just after air flow is initiated. The mechanical disturbance of the potato pieces loosens them sufficiently so that they then fluidize in the upflowing air. The apparatus of this invention as illustrated in FIG. 1, provides means for such mechanical assistance for fluidization without causing physical damage to the potato pieces. It comprises a vertically movable rigid horizontal screened or perforated support platform 26 mounted on a vertical support shaft 27. Shaft 27 passes through a slide bearing 28 mounted in the bottom of basket 5. Shaft 27 extends sufficiently beyond slide bearing 28 so that when basket 5 is mounted inside cooking chamber support base 1, it will engage in the top portion of slide bearing 29. Slide bearing 29 is mounted in distributor plate 3. Another drive shaft 30 fitted into the bottom portion of slide bearing 29, extends down through slide bearing 31 mounted in housing 14 to electric solenoid reciprocating motor 32. At startup of cooking, solenoid 12 is energized to lift support platform 26 one or two inches, a few seconds after blower 10, motor 11 and heating coil 12 are energized. This provides additional mechanical movement of the potato charge in basket 5 to overcome interlocking or jamming, and initiate fluidization. Electric solenoid 32 is de-energized after a few seconds. If jamming develops solenoid 32 can be energized and de-energized repeatedly.

Horizontal rake arms attached to drive shaft 27, can be employed in place of perforated support platform 28.

Figure 2:
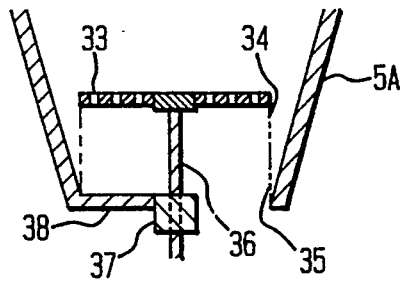
FIG. 2 shows the vertical cross-section of the bottom of a somewhat different cooking basket provided with a vertically movable perforated support platform.

Basket 5 can be provided with a vertically movable bottom screen (or perforated plate) instead of a fixed bottom screen 6. This alternate embodiment is illustrated in cross-section in FIG. 2. Perforated plate platform 33 is of the same diameter dimension as the inside diameter of bottom opening 35 of basket 5A. Platform 33 is mounted on vertical drive shaft 36 which shaft passes through slide bearing 37 which bearing is supported on bracket arm 38 fastened to basket 5A. A vertical coiled wire spring 34 having a diameter equal to platform 33 is fastened at its top and to platform 33 and its bottom end to basket bottom 35. When basket 5A is mounted in cooking chamber base 1 of FIG. 1, vertical drive shaft 36 is inserted in slide bearing 29 of FIG. 1. When platform 33 is in its lowered position coiled wire spring 34 is fully retracted. When platform 33 is lifted by solenoid motor 32, the coiled wire spring 34 is extended one to two inches. A sufficient number of turns of wire are provided in the coil wire spring so that when expanded, the spacing between wires in the coil is small enough to retain the smallest potato pieces. The spring employed is a low tension spring so as not to interfere with the operation of reciprocating solenoid motor 32.

Figure 3:
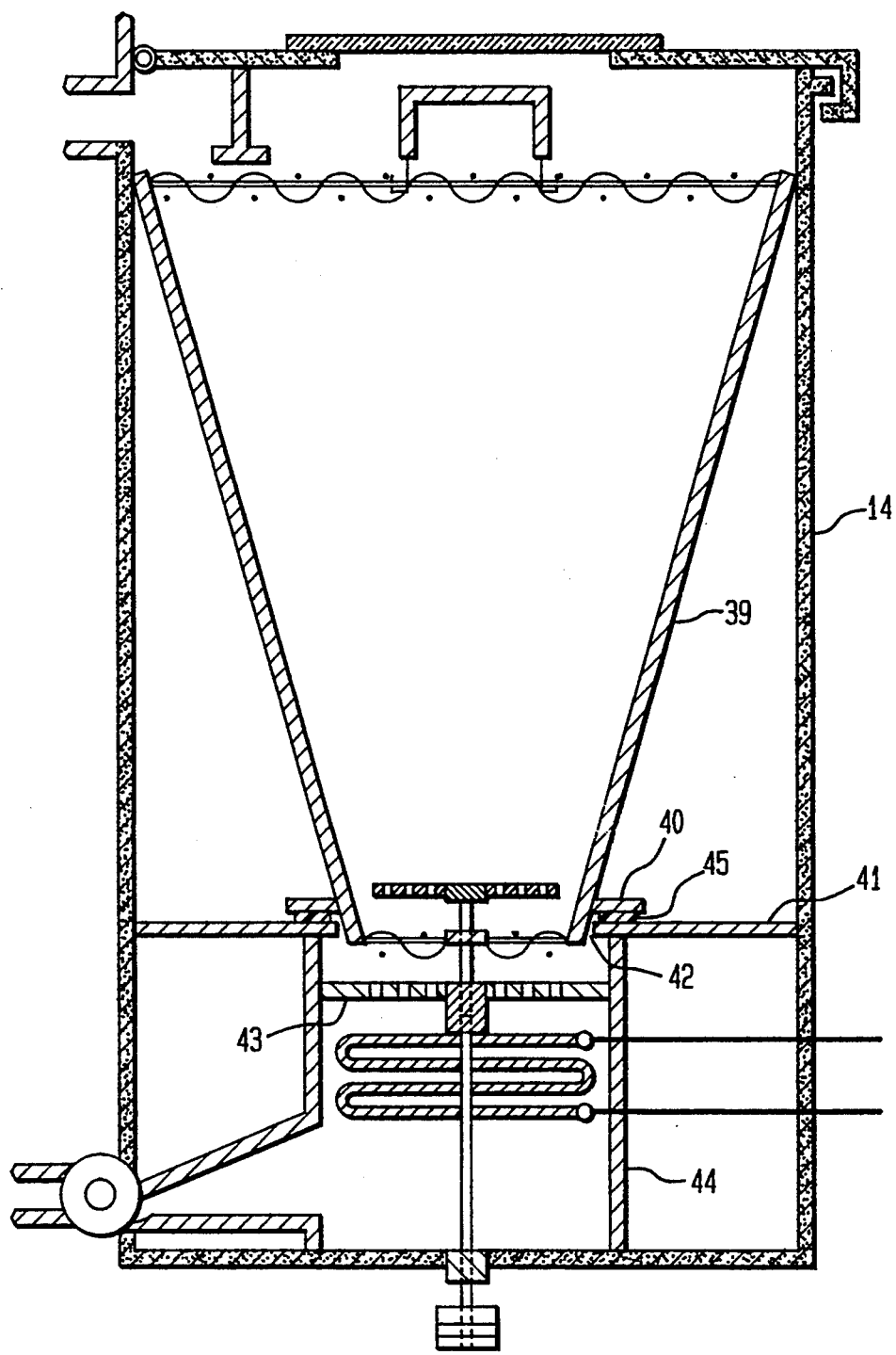
FIG. 3 is a vertical cross-section view of the up flow hot air cooking apparatus comprising a movable cooking basket provided with a flange and a releasable closure mounted on a basket support base in a housing.

In the embodiment of this invention illustrated in FIG. 3, the removable cooking basket 39 is similar to basket 5 in FIG. 1 except that it is provided with a flange 40 welded to its exterior unperforated sidewall above the bottom of the basket at an angle of 90° to the conical axis of the basket. Basket 39 is mounted on horizontal cooking chamber support base 41. Support base 41 is unperforated metal sheet and is fastened on support cylinder and air duct 44 in housing 14. Support base 41 is provided with an air passage opening 42 at its center, with a diameter larger than the bottom diameter of basket 39 but smaller than the outside diameter of flange 40, so that the bottom of basket 39 can fit into support base opening 42. Perforated distributor plate 43 is fastened to support cylinder 44 at a level just below the bottom of basket 39 when the basket is mounted on support base 41. A heat resistant flange 40 and support base 41 to insure that heated air plastic seal closure gasket 45 is provided between basket flows up through the interior of basket 39 and to minimize any air flow bypassing the basket. More precise machined matching of flange 40 and support base 41 can permit sufficient closure to adequately restrict bypassing air flow without requiring seal gasket 45.

I claim:

1. An apparatus for cooking potato pieces by heated air comprising:

a housing; a cooking chamber base within said housing, said cooking chamber base being in the shape of an inverted frustum of a cone with its larger diameter on top, said chamber being open at the top and bottom;

a removable air permeable basket in the shape of an inverted frustum of a cone similar in shape to said cooking chamber, with said basket bottom outside diameter almost equal to inside bottom diameter of cooking chamber base; said basket having a screen bottom and a removable screen cover on top;

a means for heating air, a means for blowing heated air upwardly through said cooking chamber base and said screened basket to fluidize potato pieces in basket.

2. Apparatus as claimed in claim 1 wherein said cooking chamber base is provided with a perforated bottom distributor to attain more uniform fluidization of the potato pieces during cooking.

3. An apparatus for cooking potato pieces as claimed in claim 1 wherein means for heating air provides air temperatures 400° F. to 500° F., and wherein means for blowing heated air provides air velocities of 500 to 600 feet per minute at the bottom of said cooking chamber.

4. Apparatus as claimed in claim 1 wherein means are provided to increase blower speed at startup of cooking for a time period of several seconds to overcome jamming of the potato pieces and attain their fluidization.

5. Apparatus as claimed in claim 1 wherein a means is provided for mechanically moving jammed potato pieces in said basket into upwardly flowing air to attain fluidization.

6. Apparatus as claimed in claim 1 wherein a vertically movable platform is mounted within basket above bottom screen, to support potato pieces, including means for changing the relative elevation of said support platform and basket bottom screen at start of cooking.

7. Apparatus as claimed in claim 1 wherein the bottom of said basket is a vertically movable perforated support platform, including means for changing relative elevation of said support platform and bottom of basket.

8. Apparatus as claimed in claim 1 wherein means are provided to increase blower speed at startup of cooking and wherein the bottom of said basket is a vertically movable perforated support platform, including means for changing the relative elevation of said support platform and bottom of basket.

9. An apparatus for cooking potato pieces by heated air comprising a cooking chamber housing, a cooking chamber support base for a removable cooking basket within said housing, said support base provided with a passage for air flow; an air permeable cooking basket in the shape of an inverted frustum of a cone with its larger diameter on top, said basket having an impermeable sidewall, an air permeable foraminous bottom and a removable air permeable foraminous retaining cover on top; said basket mounted to mate into said support base air passage, means to restrict air flow between support base air passage and exterior of said basket so as to direct the flow of air into interior bottom of basket; means for heating air, means for blowing heated air through support base air passage upwardly through said cooking basket to fluidize potato pieces in basket.

10. Apparatus as claimed in claim 9 wherein a releasable closure means to restrict air flow is provided between exterior of said basket and support base air passage.

11. Apparatus as claimed in claim 9 wherein means for heating air provides air temperatures of 400° F. to 500° F. at inlet to cooking chamber basket.

12. Apparatus as claimed in claim 9 wherein means for blowing heated air provides 500 to 1000 feet per minute air at inlet to cooking chamber basket.

13. Apparatus as claimed in claim 9 wherein means are provided to increase blower speed at startup of cooking for a time period of several seconds to overcome interlocked jamming of the potato pieces to attain their fluidization.

14. Apparatus as claimed in claim 9 wherein means for heating air provides air temperatures of 400° F. to 500° F. and wherein means for blowing heated air provides 500 to 1000 feet per minute air at inlet to cooking chamber basket.

15. Apparatus as claimed in claim 9 wherein a means is provided for mechanically moving interlocked potato pieces upwardly in said basket into upwardly flowing air to attain fluidization.

16. Apparatus as claimed in claim 9 wherein a vertically movable air permeable platform is mounted within interior of basket and slightly above bottom of basket, and means are provided for changing relative elevation of platform and basket bottom at start of cooking to mechanically disturb interlocked potato pieces and attain their fluidization.

17. Apparatus as claimed in claim 9 wherein the sidewall of said basket is provided with a flange for mounting basket over said support base air passage.

18. Apparatus as claimed in claim 9 wherein the interior surfaces of the cooking basket are coated with teflon.

19. Process for cooking potato pieces by heated air which comprises partially filling potato pieces into an air permeable cooking basket in the shape of an inverted frustum of a cone with its larger diameter on top, said basket having an impermeable sidewall, an air permeable foraminous bottom and a removable foraminous retaining cover on top, mounting said basket on a cooking chamber support base in a cooking chamber housing, said support base provided with a passage for air flow, mounting said basket to mate into said support base air passage, restricting air flow between support base air passage and exterior of said basket so as to direct the flow of air into the interior bottom of the basket, heating the air to between 400° F. to 500° F., blowing said heated air upwardly into the bottom of said basket at a velocity sufficient to fluidize all the potato pieces, maintaining such heated air fluidization until the potato pieces develop a yellow brown color similar to french fried potatoes and then removing the cooked potato pieces from said basket.

20. Process as in claim 19 wherein the total moisture content of the air cooked potato pieces is maintained over 40%.

* * * * *